Patented Aug. 8, 1950

2,517,650

UNITED STATES PATENT OFFICE 2,517,650

ALKOXY AMINOPYRIMIDINES

Harris L. Friedman, New York, and Leo D. Braitberg, Yonkers, N. Y., assignors, by mesne assignments, to Nepera Chemical Co., Inc., Nepera Park, N. Y., a corporation of New York No Drawing. Application December 3, 1946, Serial No. 713,848

3 Claims. (Cl. 260—251)

The principal object of our invention is to provide chemical compounds which may be useful in germ infections, and it relates to new pyrimidine compounds and particularly to pyrimidines substituted in the 2- and 5-positions.

We have found that 2-alkoxy, 5-aminopyrimidines have valuable bacteriostatic properties, particularly against *Mycobacterium tuberculosis*, and, therefore, a further object of our invention is to provide such substituted pyrimidine derivatives, which are useful for devitalizing bacteria or rendering them harmless and innocuous.

Other objects of our invention will be evident from a consideration of this specification.

The general formula of our compounds is

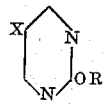

in which R is an alkyl radical and X is an amino group or a radical reducible to an amino group or a radical hydrolysible to an amino group. The alkyl radicals may consist of one to eight carbon atoms, and those with four and six carbon atoms are apparently the most active.

As starting material to obtain our new compounds we use 2-chloro, 5-nitropyrimidine. The preparation of this compound, through several reactions, is described in the literature, and is not a subject matter of this application. We react the chloro compound with sodium alcoholate dissolved in the corresponding alcohol, and reduce the thus formed alkoxy compound in acid solution with iron or stannous chloride. For the reduction we prefer to use hydrochloric acid, but other acids, like acetic acid may be used also.

The chemical reaction of our process is the following:

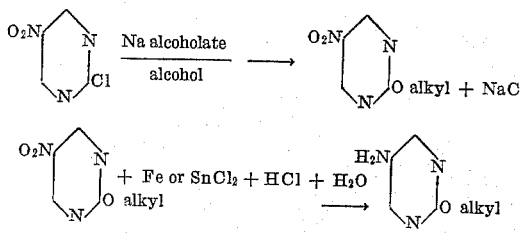

The following are several illustrative examples of some of the preferred procedures of carrying out our invention, which are given for illustration and not for limitation.

Example I 0.61 gram of sodium was dissolved in 40 ccs. of (n) butyl alcohol; after cooling to 10° C., 4.1 grams of 2-chloro, 5-nitropyrimidine were added. The reaction mixture turned yellow and darkened after half an hour. It was stirred overnight at room temperature, and then heated to 80–90° C. for three and a half hours. The alcohol was then distilled off and 100 ccs. water were added. The 3.8 grams of yellow crystals thus formed were collected and recrystallized from methanol-water solution. The product, 2-(n)-butyloxy, 5-nitropyrimidine, forms lustrous crystals, and has a melting point of 49.5–50° C.

Example II 3.2 grams of 2-(n)-butyloxy, 5-nitropyrimidine were placed into a flask with 25 ccs. of methanol, 15 ccs. of water, 0.5 cc. acetic acid and 7 grams of iron filings and refluxed for 4 hours. Then 0.9 cc. of a 40% sodium hydroxide solution and 25 ccs. methanol were added, shaken up with Filtercel and filtered. The solvents were distilled off in vacuum and the alkaline residue extracted with ether. From the ether extract 2.4 grams of crystals were obtained, which were recrystallized from benzene-petroleum ether. The product, 2-butyloxy, 5-aminopyrimidine has a melting point of 72–72.5° C. It is soluble in methanol and ethanol, slightly soluble in ether and petrol ether, and slightly soluble in water.

Example III 0.50 gram of sodium was dissolved in 32 ccs. (n)-hexyl alcohol. The solution was cooled to 20° C. and 3.0 grams of 2-chloro, 5-nitropyrimidine were added. The reaction mixture was stirred overnight at room temperature and the excess (n)-hexyl alcohol was then distilled off in vacuum. The product 2-(n)-hexyloxy, 5-nitropyrimidine remained as an oily product.

Example IV

The crude nitro compound obtained as described in Example III was dissolved in 10 ccs. of methanol and 100 ccs. of concentrated hydrochloric acid and 25 grams of stannous chloride were added. The reaction mixture was heated to 60–75° C. The solvents were extracted with ether and the aqueous solution was made alkaline with sodium hydroxide. From this alkaline mixture the free amine was extracted with ether. After the ether was evaporated on oily residue remained. This was distilled in 2 mm. vacuum at 168° C. The collected oil crystallized on cooling. The product 2-(n)-hexyloxy, 5-aminopyrimidine was recrystallized from petroleum ether, and has a melting point of 81–82° C. It is soluble in methanol and ethanol, slightly soluble in water.

The compounds of our invention have similar properties. As most organic amines, they have the tendency to color up on long standing and as they are unstable and if they are intended to be used for therapeutic purposes, it is advisable to make derivatives of them which are more stable, and which are also soluble in water. We accomplish this by substituting one or more hydrogens in the amino group. For instance, we prepare the methylenesulfonate derivative as described in Example V.

*Example V*

18.4 grams of sodium acid sulfite were dissolved in 125 ccs. water to which 12.5 ccs. of a 40% formaldehyde solution were added and to this solution 25 grams of 2-butyloxy, 5-aminopyrimidine were added. The reaction mixture was digested on the steam bath for one hour. After cooling, the copious crystals were collected and washed with methanol. Upon recrystallization, the 2-butyloxy, 5-aminopyrimidine sodium methylene sulfonate from 50% methanol forms pearly white plates, which were dried at 105° C.

Besides the methylene sulfonate derivative other substitutions in the amino group will stabilize and solubilize the compounds. Such derivatives are, for instance, alkali metal ethylidene sulfonate, alkali metal glucose bisulfite compounds, also the benzylideneamino, glucosidamino, phthaloylamino and various other compounds of similar characteristics.

The activities of the compounds included in our invention against *Mycobacterium tuberculosis* are tabulated below. The figures indicate the highest dilution that still inhibits the growth of *Mycobacterium tuberculosis* under a particular set of experimental conditions as regards inoculum, culture, etc., thereby making a comparable series.

| Name of compound | Highest dilution showing bacteriostasis |
|---|---|
| 2-butyloxy, 5-aminopyrimidine | 1/800,000 |
| 2-hexyloxy, 5-aminopyrimidine | 1/1,600,000 |
| 2-butyloxy, 5-aminopyrimidine sodium methylene-sulfonate | 1/200,000 |

The compounds of our invention present highly valuable and unexpected bacteriostatic properties, especially against such bacteria as cause tubercular infections, although their usefulness is not limited to that particular infection.

We do not limit ourselves to the specific limitations mentioned, as these are given solely for the purpose of clearly describing our invention as set forth herein.

What we claim is:
1. 2-butyloxy, 5-aminopyrimidine sodium methylene sulfonate.
2. 2-hexyloxy-5-amino-pyrimidine sodium methylene sulfonate.
3. Compounds of the general formula:

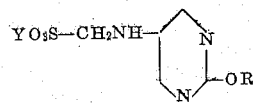

in which R is an alkyl radical having from 1 to 8 carbon atoms and Y is an alkali metal.

HARRIS L. FRIEDMAN.
LEO D. BRAITBERG.

REFERENCES CITED

The following references are of record in the file of this patent:

UNITED STATES PATENTS

| Number | Name | Date |
|---|---|---|
| 2,339,788 | Lee | Jan. 25, 1944 |

OTHER REFERENCES

Journal American Chem. Soc., 64, 567–570 (1942).